United States Patent [19]
Dürbaum

[11] Patent Number: 6,084,784
[45] Date of Patent: Jul. 4, 2000

[54] SWITCHED MODE POWER SUPPLY WITH REDUCED REFLECTED POWER

[75] Inventor: Thomas Dürbaum, Aachen, Germany

[73] Assignee: U.S. Philips Corporation, New York, N.Y.

[21] Appl. No.: 09/328,022

[22] Filed: Jun. 8, 1999

[30] Foreign Application Priority Data

Jun. 24, 1998 [DE] Germany ............................ 198 28 038

[51] Int. Cl.$^7$ ............................ H02M 3/335; H02M 3/24
[52] U.S. Cl. ................................ 363/21; 363/97; 363/131
[58] Field of Search ............................ 363/21, 95, 97, 363/131, 16, 20

[56] References Cited

U.S. PATENT DOCUMENTS

| | | | |
|---|---|---|---|
| 3,986,097 | 10/1976 | Woods | 321/2 |
| 4,901,215 | 2/1990 | Martin-lopez | 363/21 |
| 5,303,138 | 4/1994 | Rozman | 363/21 |
| 5,745,359 | 4/1998 | Faulk | 363/95 |
| 5,764,495 | 6/1998 | Faulk | 363/21 |

FOREIGN PATENT DOCUMENTS

0336725B1 7/1994 European Pat. Off. ....... H02M 3/335

*Primary Examiner*—Adolf Deneke Berhane
*Assistant Examiner*—Bao Q. Vu
*Attorney, Agent, or Firm*—Dicran Halajian

[57] ABSTRACT

A switched mode power supply includes a transformer having a primary winding and a secondary winding. A primary current flows through the primary winding during a first time period and a secondary current flows through the secondary winding during a second time period. A first switching device is connected in series to the primary winding, and a second switching device is connected in series to the secondary winding. In addition, the power supply includes primary and secondary control units. The secondary-side control unit switches the second switching device to control the power supply output by changing the energy returning back to the transformer during the second period of time. The primary-side control unit switches the first switching device to limit the supplied energy supplied by the transformer during the first period of time toward the input of the switched mode power to a predetermined value. This eliminates the need for transmission of a control signal from the secondary side to the primary side where DC decoupling is necessary.

11 Claims, 3 Drawing Sheets ically used

SWITCHED MODE POWER SUPPLY WITH REDUCED REFLECTED POWER

FIELD OF THE INVENTION

The invention relates to a switched mode power supply comprising a transformer having a primary winding to which a first switching device is connected in series, and a secondary winding to which a second switching device is connected in series, in which switched mode power supply, when in operation, first periods of time with a primary current flowing through the primary winding alternate with second periods of time with a secondary current flowing through the secondary winding and in which a secondary-side control unit is provided for controlling the output voltage or the output current of the switched mode power supply by adaptation of the return of part of the energy supplied by the transformer in the direction of the output of the switched mode power supply back into the transformer in the second periods of time.

Such switched mode power supplies are especially used as bidirectional switching regulators (flyback converters) for AC/DC conversion or DC/DC conversion in the range of small and medium powers (up to several hundred watts).

BACKGROUND OF THE INVENTION

Inter alia from U.S. Pat. No. 3,986,097 (see, for example FIG. 1) is known a switched mode power supply working as a flyback converter. Here too, first periods of time in which a primary current flows through the primary winding of the transformer alternate with second periods of time in which a secondary current flows through the secondary winding of the transformer. The primary current linearly rises from a minimum value to a maximum value in the first periods of time. The secondary current linearly drops from a maximum value to a minimum value in the second periods of time. In ranges where the primary current is positive, energy is transported from the primary side to the transformer. At the beginning of the second periods of time, this energy is then transported by the transformer on the secondary side in the direction of the output of the switched mode power supply, while the secondary current is positive. After the secondary current has reached the zero value, it becomes negative and further drops to the minimum value of the secondary current. In this range the part of the energy supplied by the transformer on the secondary side, which energy is not necessary for powering the load, is reflected back into the transformer. By varying the minimum value of the secondary current, the energy reflected back to the transformer by the secondary side is adjusted. The value of the respective minimum secondary current is a contributory factor for determining the minimum value of the primary current of the next first time slot in accordance with the translation ratio of the transformer. The minimum value of the primary current now determines the range in which the primary current is negative and thus the amount of energy that is returned by the transformer in the direction of the input of the switched mode power supply in the respective first time slot.

In EP 0 336 725 B1 is described a switched mode power supply in which a first switching device is connected in series with the primary winding, which switching device is controlled by a control circuit. The control circuit evaluates a falling auxiliary voltage on a primary-side auxiliary winding of the transformer. The first switching device is controlled by the control circuit in such a way that the length of the periods of time in which the first switching device is switched on, i.e. is closed and thus conductive, has a fixed value. The control circuit switches on the primary-side switching device, i.e. brings it to the closed and thus conductive state, as soon as the voltage on the auxiliary winding becomes positive. The control circuit controls the switching device so that the length of the periods of time in which the first switching device is switched on has a fixed value. The first switching device thus has a constant switch-on time. A second switching device connected in series with the secondary winding of the transformer is controlled by a control unit. This unit detects the output voltage of the switched mode power supply, compares the detected voltage to an internal reference voltage and thus controls, in dependence on the predefinable value of the reference voltage, the length of the periods of time in which the second switching device is switched on, and, accordingly, the amount of energy reflected back from the secondary side to the transformer and to the primary side. With an increasing load on the output of the switched mode power supply, the amount of reflected energy decreases. With a decreasing load, the amount of reflected energy increases. The control unit thus controls the output voltage of the switched mode power supply to a constant value. In the switched mode power supply it is no longer necessary to transmit a control signal describing the deviation of the output voltage from a setting value to the primary side via a DC isolation path, for example, by means of an optocoupler. On the other hand, only in the ranges with a negative primary current is a zero-voltage switching of the primary-side switching device possible, because then the diode connected in parallel to the switching device is conductive. With rather large output powers, the ranges in which the primary current is negative are reduced and the ranges in which a positive primary current flows are lengthened accordingly. Especially with large output powers for which the first switching device has the largest ohmic losses, this may lead to the fact that in first periods of time no negative primary current flows any longer and, accordingly, no zero-voltage switching of the first switching device is guaranteed any longer.

SUMMARY OF THE INVENTION

It is an object of the invention to provide a further variant of a switched mode power supply in which a control signal need not be transmitted from the secondary side to the primary side with DC isolation either and in which a zero-voltage switching of the first switching device is guaranteed and in which the power reflected back is kept smallest possible irrespective of the output load.

The object is achieved in that a primary-side control unit is provided which is used for controlling the energy supplied by the transformer in the first periods of time in the direction of the input of the switched mode power supply to a predefinable value.

The respective amount of energy flowing back to the primary side in the first periods of time is now controlled to a predefinable value irrespective of the output power. Even with large output powers there is ensured that the ranges within the first periods of time in which a zero-voltage switching of the first switching means is possible are sufficiently long. A zero-voltage switching of the first switching means is thus ensured even with a maximum output power. As a result of the reflection of energy from the secondary side back to the transformer and a respective energy flow from the transformer in the direction of the input of the switched mode power supply is furthermore unnecessary to transmit a control signal from the secondary side to the primary side over a DC-isolated path, because the control of the output voltage/current is effected by the secondary-side control unit.

A deviation of the output voltage to be controlled (or alternatively, of the output current to be controlled) from a setting value in the case of a change of load, influences the value of the reflected energy and thus the minimum value of the primary current at the beginning of the next first periods of time. Since the primary-side control, however, tries to keep this value the same as a predefinable fixed value, the control controls the primary-side switching device so that the deviation is counteracted. If a reflection has occurred during a switching cycle, less energy is transported from the primary side to the secondary side in the next switching cycle.

For adjusting the amount of energy supplied in the first periods of time by the transformer in the direction of the input of the switched mode power supply, two embodiments are proposed. On the one hand, a predefinable primary current value occurring each time at the beginning of the first time slot may be used as a setting value on which the control by the primary-side control unit is based. As the setting value may be used, for example, a reference voltage which is easy to generate, which reference voltage is compared to a voltage that is proportional to the detected primary current. On the other hand, an embodiment is proposed in which a predefinable space of time between the beginning of the first periods of time and the respective next zero-crossing of the primary current is used as the setting value that forms the basis of the control by the primary-side control unit. Such an embodiment is especially interesting for integrated circuits in which spaces of time may easily be processed by means of clock signals.

For adapting the switch-off instants of the first switching device by means of the primary-side control unit there is proposed, on the one hand, to realize this at the end of the first periods of time by adapting a primary current value that depends on the output power of the switched mode power supply. This may easily be effected in that a reference voltage corresponding to the difference between the detected primary current at the beginning of the first periods of time and the primary current setting value for these instants is compared to a voltage that is proportional to the detected primary current. The first switching device is switched off when the voltage proportional to the detected primary current reaches the value of the reference voltage. There is another possibility in that the primary-side control unit is used for adapting the switch-off instants of the first switching device by adapting the length of the first periods of time which depends on the output power of the switched mode power supply. This embodiment is again advantageous, more particularly because the time lengths can be processed well by means of clock signals for realizations in integrated circuits.

In another embodiment there is proposed that the secondary-side control unit comprises means for forming a first reference value from the difference between the output voltage/current of the switched mode power supply and a setting value for the output voltage/current and in that means for forming a second reference value derived from the value of the secondary current are provided and in that the second switching device is switched off when the second reference value reaches the value of the first reference value. An alternative for determining the switch-off instants of the second switching device by the secondary-side control unit implies that means are provided for forming a second reference value derived from the time elapsed since the zero-crossing of the secondary current within a second time slot, which can easily be converted in integrated circuits.

The invention also relates to a circuit arrangement, more particularly, an integrated circuit having the primary-side control unit and/or the secondary-side control unit for the switched mode power supply described above.

These and other aspects of the invention will be apparent from and elucidated with reference to the embodiments described hereinafter.

DETAILED DESCRIPTION OF THE INVENTION

Figure 1:
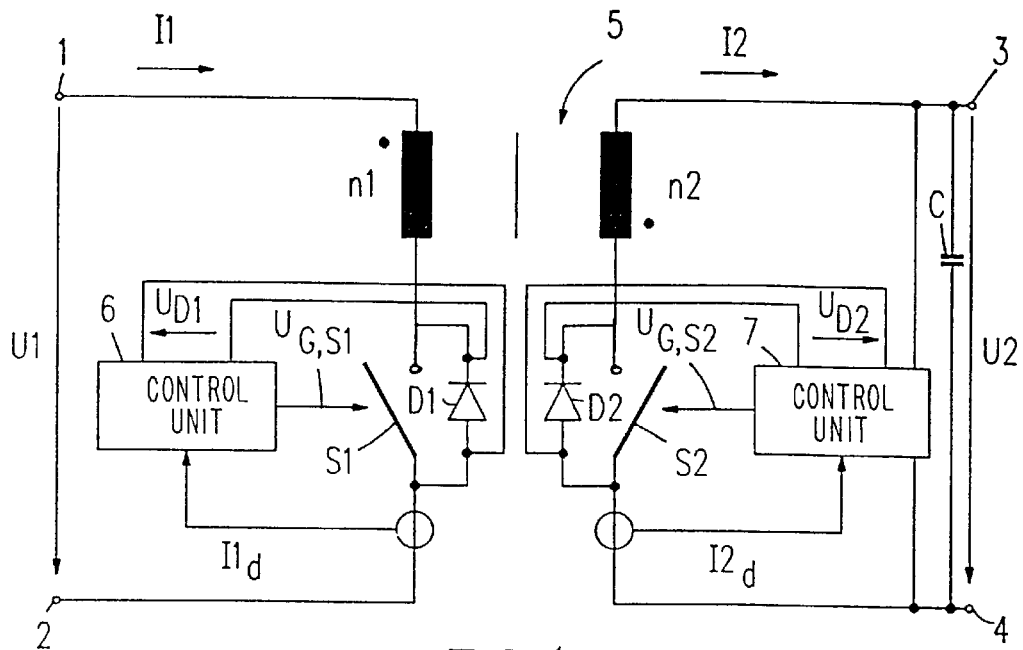
FIG. 1 shows a switched mode power supply according to the invention.

The switched mode power supply shown in FIG. 1 of the type of a bidirectional flyback converter has at its input two input terminals 1 and 2 between which an input voltage U1 is applied. The input terminal 1 having a more positive potential than input terminal 2 is connected to the primary winding of a transformer 5 which has n1 turns. The other connection of the primary winding is connected to a switching device S1 to which a diode D1 is connected in parallel. The switching device S1 is, for example, a MOS field effect transistor. In this case, the so-called body diode of the field effect transistor may be used as the diode D1. The cathode of the diode D1 is connected to the primary winding of the transformer 5, the anode of the diode D1 is connected to the input terminal 2 so that the parallel combination formed by the switching device S1 and the diode D1 lies between the primary winding of the transformer 5 and the input terminal 2. The switching positions of the switching device S1 are determined by the control unit 6 by applying a control signal $U_{G,S1}$. For the case where the switching device S1 is arranged as a MOS field effect transistor, the control signal $U_{G,S1}$ corresponds to the gate voltage of the field effect transistor. For adjusting the switching positions of the switching device S1, the control unit 6 detects, on the one hand, the primary current I1 by means of a current measuring device (not shown) which applies a primary current detector signal $I1_d$ to the control unit 6. Furthermore, the voltage $U_{D1}$ present on the diode D1, which drops in reverse direction on the diode D1, is tapped and applied to the control unit 6.

On the output of the switched mode power supply there is an output voltage U2 between two output terminals 3 and 4. The output terminal 3 having a more positive potential than output terminal 4 is connected to the secondary winding of the transformer 5 having n2 turns. The other terminal of the secondary winding is connected to a switching device S2 to which a diode D2 is connected in parallel. The cathode of the diode D2 is connected to the secondary winding and the anode of the diode D2 is connected to the output terminal 4. The parallel combination formed by the diode D2 and the switching device S2 thus lies between the secondary winding of the transformer 5 and the output terminal 4. The switching device S2 and the diode D2 are preferably arranged (just like the switching device S1 and the diode D1 on the primary side) as a MOS field effect transistor and its body diode. A control unit 7 on the secondary side controls the switching device S2 by means of a control signal $U_{G,S2}$ which signal in the embodiment of the switching device S2 as a MOS field effect transistor is the gate voltage applied to this transistor. Also on the secondary side of the switched mode power supply there is a current measuring device measuring here the secondary current I2 and deriving therefrom the secondary current detector signal $I2_d$ which is applied to the control unit 7. Furthermore, the voltage $U_{D2}$ falling in reverse direction at the diode D2 is tapped and applied to the control unit 7. In addition, for the case where the output voltage U2 is controlled to a constant value, this voltage is also applied to the control unit 7. Alternatively, or additionally, especially with chargers, the output current produced on the output of the switched mode power supply can be controlled to a constant value while the control unit 7 is then supplied with a detector signal for the output current instead of the output voltage U2, which however, is not shown in FIG. 1. Furthermore, a smoothing capacitor C is provided whose terminals are connected to the output terminals 3 and 4, which capacitor is thus connected in parallel to the output of the switched mode power supply. In actual embodiments, a complex output filter is often to be used instead of the smoothing capacitor C, which, however, is unessential to the invention.

Figure 2:
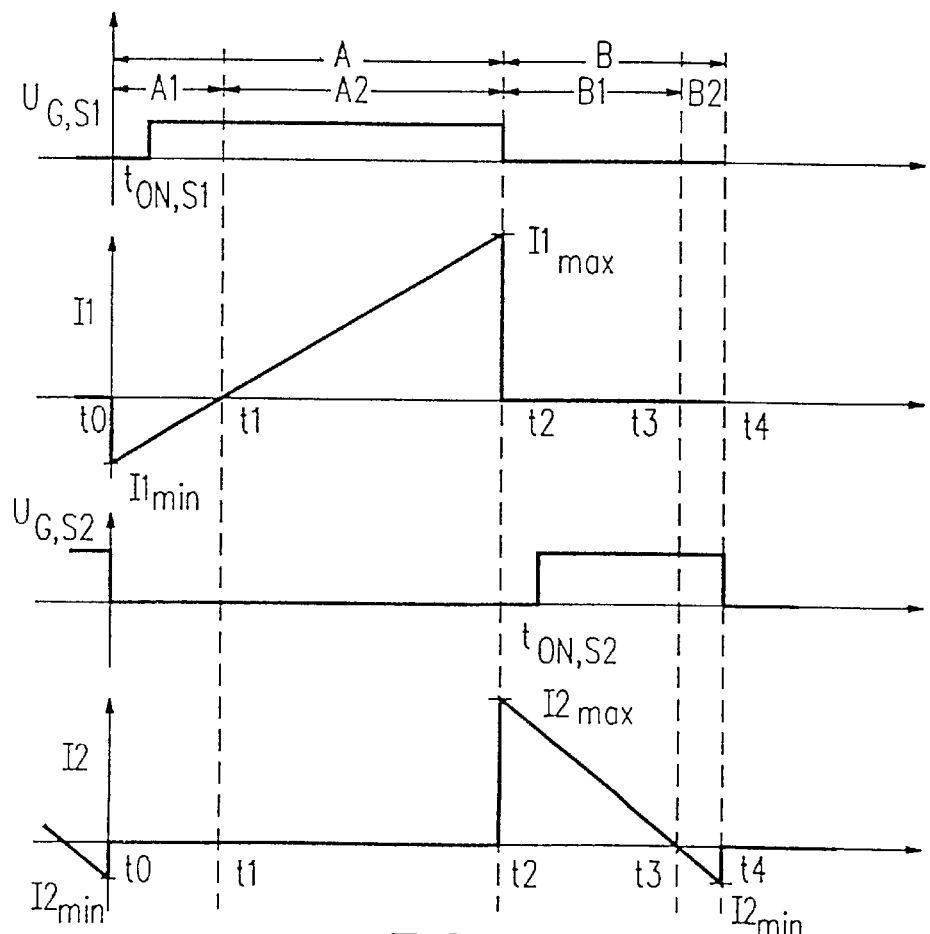
FIG. 2 shows timing diagrams for the primary and secondary currents and for the control signals of the two switches on the primary and secondary sides.

The control principle used as a basis for the switched mode power supply shown in FIG. 1 will now be clarified with the aid of FIG. 2. FIG. 2 shows the time patterns of the control signal $U_{G,S1}$ applied to the switching device S1, of the primary current I1, of the control signal $U_{G,S2}$ used for controlling the switching device S2, and of the secondary current I2. The control signals $U_{G,S1}$ and $U_{G,S2}$ in the present example of embodiment represent gate voltages for the switching devices S1 and S2 arranged as MOS field effect transistors. For the case where the gate voltage $U_{G,S1}$ has the zero value, the switching device S1 is switched off, that is to say, open and blocking. If this voltage assumes a certain positive value, the switching device S1 is switched on, that is to say, closed and conductive. Similarly holds for the gate voltage $U_{G,S2}$ and the switching device S2.

Shortly before the instant t0, the switching device S1 is switched off and the witching device S2 is switched on. Accordingly, no primary current I1 is flowing, the secondary current I2 is negative and decreases linearly. At the instant t0, the switching device S2 is switched off, which leads to the fact that the secondary current I2 abruptly drops to zero. The energy stored in the transformer because the negative secondary current is flowing now provides that a negative primary current I1 starts to flow. This negative primary current I1 rises in a linear pattern between the instants t0 and t2 and starts at a minimum value $I1_{min}$ at instant t0 which minimum value is inversely proportional to the turns ratio n1/n2 and proportional to the minimum value $I2_{min}$ of the secondary current to which the secondary current has dropped until instant t0. When a negative primary current I1 is flowing, the energy stored in the transformer between the instants t0 and t1 is transported in the direction of the input of the switched mode power supply. The diode D1 is then conductive so that during the period of time between the instants t0 and t1 a zero-voltage switching of the switching device S1 may take place. In FIG. 2 is shown as an example a switch-on instant $t_{ON,S1}$. The instant $t_{ON,S1}$ is put closest to the instant t0 to reduce the ohmic losses because the resistance of the closed switching device S1 is smaller than the resistance of the diode D1 in forward direction. The zero-crossing of the linearly rising primary current I1 lies at instant t1, which primary current then rises to its maximum value $I1_{max}$ until instant t2. During the period of time between the instants t1 and t2, energy is transported and stored in the transformer 5 from the primary side.

At the instant t2, the switching device S1 is switched off, so that the primary current I1 abruptly drops to zero. The energy stored in the transformer 5 by the positive current I1 until the instant t2 now causes a secondary current I2 to flow from instant t2 onwards. This secondary current I2 begins with its maximum value $I2_{max}$ and then decreases linearly from there. The maximum value $I2_{max}$ is proportional to the translation ratio n1/n2 of the transformer 5 and to the maximum value $I1_{max}$ of the primary current. During the time when a positive secondary current I2 is flowing, the diode D2 is in the conductive state. A zero-current switching of the switching device S2 may thus take place from instant t2 onwards until instant t3 where the zero-crossing of the secondary current I2 lies and from which instant this secondary current F2 becomes negative. A switch-on instant $t_{ON,S2}$ is shown as an example for the switching device S2. Between the instants t2 and t3, the energy stored in the transformer between the instants t1 and t2 is transported in the direction of the output of the switched mode power supply for supplying power to a load. At the instant t3, the transformer 5 has delivered its total energy stored therein. The voltage decreasing at the smoothing capacitor C now provides, however, from instant t3 onwards, that the secondary current I2 continues to flow through the switching device S2 which has meanwhile been switched on. The secondary current I2 steadily continues to flow at instant t3 and has the same slope in the negative range. The secondary current I2 then decreases until instant t4 up to its minimum value $I2_{min}$. At the instant t4 the switching device S2 is switched off.

From the instant t4 onwards, the timing patterns are recurrent in the transient state of the switched mode power supply as they have been represented and described for the range between t0 and t4. The period of time between the instants t0 and t4 thus corresponds to the switching period of the switched mode power supply. A switching period may thus be subdivided into first periods of time A and second periods of time B. The first periods of time A have each a range A1 where a negative primary current flows and a range A2 where the primary current is positive. The second periods of time B have each a range B1 where the secondary current is positive and a range B2 where the secondary current is negative.

Figure 3:
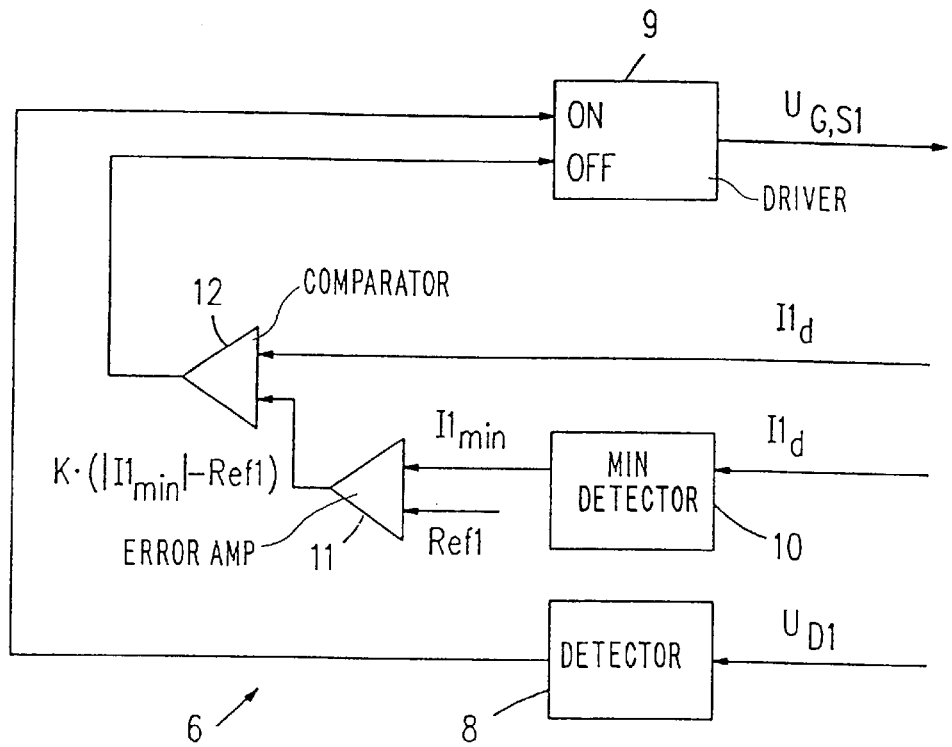
FIG. 3 shows a block circuit diagram for a primary-side control unit.

FIG. 3 shows a block circuit diagram for the control unit 6 on the primary side. A function block 8 describes the switching units used for processing the voltage $U_{D1}$ on the diode D1 detected by the control unit 6. If the function unit 8 detects the diode D1 to be conductive, it generates within a predefinable safety margin—like here difference between t0 and $t_{ON,S1}$—a signal that is applied to an ON-input of a driver circuit 9. This signal provides that the driver circuit 9 causes the switching device S1 to be switched on by means of the control signal $U_{G,S1}$. As an alternative than the evaluation of the voltage $U_{D1}$ falling on the diode, it is also possible to utilize the detected current I1 for detecting the state of the diode D1.

A function block 10 is used for evaluating the detector signal $I1_d$ describing the primary current I1. By means of the function block 10 is determined the respective minimum $I1_{min}$ of the primary current I1 for the respective switching periods. This value is compared to a reference value Ref1 by means of an error amplifier 11. The reference value Ref1 represents the desired predefinable reference value for the minimum value $I1_{min}$ of the primary current I1. The error amplifier 11 produces a signal $k \cdot (|I1_{min}|-Ref1)$ proportional to the difference between the actual value $I1_{min}$ determined by the function block 10 and the reference value Ref1, where k is a constant that depends on the structure of the error amplifier 11. In this case, the error amplifier 11 is arranged as a proportional controller. As appropriate, other types of controller can also be used in the error amplifier 11.

The value produced on the output of the error amplifier 11 is now compared to the detector signal $I1_d$ describing the actual primary current I1 by means of a comparator circuit I2. For the case where the value of Iid reaches the value $k \cdot (|I1_{min}|-Ref1)$, the comparator circuit I2 supplies a signal to the OFF-input of the driver circuit 9 which causes the driver circuit 9 to apply a switch-off signal $U_{G,S1}$ to the control input of the switching device S1.

Figure 4:
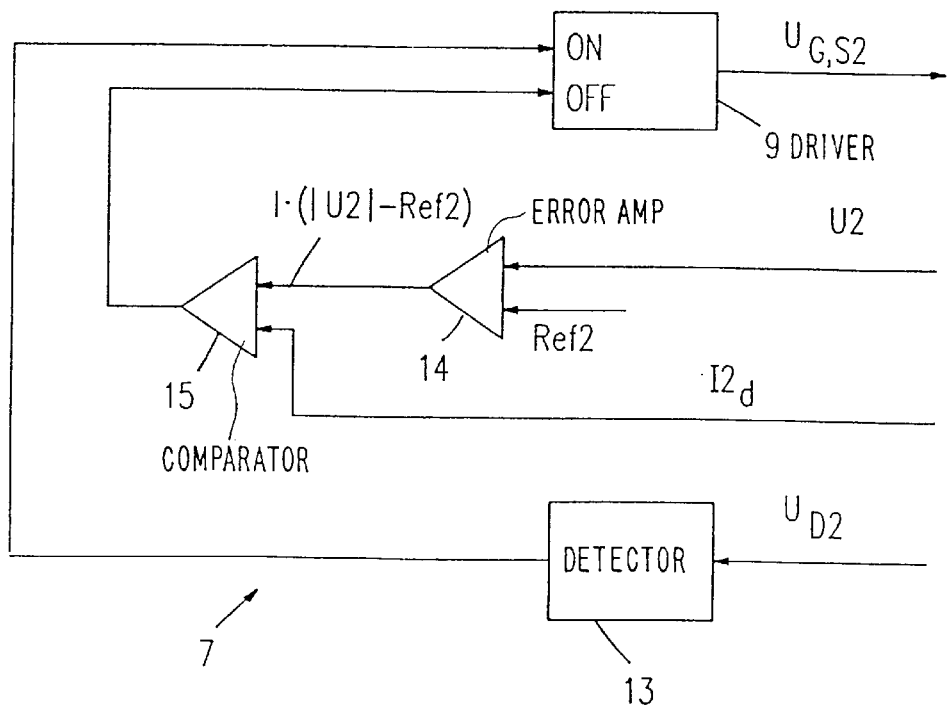
FIG. 4 shows a block circuit diagram for a secondary-side control unit.

In FIG. 4 is shown a block circuit diagram in explanation of the secondary-side control unit 7. The function block 13 is used for evaluating the voltage $U_{D2}$ decreasing on the diode D2. If the function unit 13 detects the conductive state of the diode D2, it accordingly causes the function of the function unit 8 of the primary-side control unit 6 to switch on the switching device S2 by applying a respective control signal $U_{G,S2}$ via a driver circuit 9 (of the same type as the driver circuit shown in FIG. 3). The switch-on instant of the switching device S2 is referenced $t_{ON,S2}$ and lags the instant at which the switching device S1 is switched off (instant t2) by a predefinable safety margin of time. FIG. 2 shows this by way of example. More particularly, the instant $t_{ON,S2}$ is put closest possible to the instant t2 to keep the ohmic losses smallest possible because the resistance of the switching device S2 in closed state is smaller than the forward resistance of the diode D2. Alternatively, also the detected current I2 may be used for detecting the state of the diode D2, so that the voltage $U_{D2}$ no longer needs to be measured then.

For switching off the switching device S2 (instant t4), on the one hand, the output voltage U2 (and/or as an additional embodiment (not shown)) the output current is detected and, on the other hand, the secondary current I2 is processed. The detected output voltage U2 is compared to a reference value Ref2 representing the setting value for the output voltage U2 by means of an error amplifier 14 working as a proportional controller, which error amplifier 14 produces on its output a first reference value $1 \cdot (|U2|-Ref2)$ proportional to the difference between the output voltage value U2 and the reference value Ref2. The error amplifier 14 may also be realized by other types of controllers. The value produced by the error amplifier 14 is compared to the actual values of the secondary current detector signal $I2_d$ (second reference value) describing the secondary current I2. When the value of $I2_d$ reaches the value of the signal produced by the error amplifier 14, a comparator circuit 15 evaluating this difference generates a signal to be sent to the OFF-input of the driver circuit 9, which causes the driver circuit to switch off the switching device S2 in response to the control signal $U_{G,S2}$.

When a load applied to the output of the switched mode power supply is increase, the following control mechanism is started for keeping the output voltage U2 constant. First, due to the increased energy consumption on the output of the load, the energy reflected back from the secondary side to the transformer in a switching period will be reduced, which with the control unit 7 shown in FIG. 4 leads to the fact that the secondary current I2 drops to a smaller value $I2_{min}$. This is achieved in that the switch-off instant of the switching device S2 is advanced to the previous zero-crossing of the secondary current I2. The value by which the switch-off instant of the switching device S2 is advanced depends not only on the magnitude of the change of load, but also on the structure of the control or realization of the error amplifier 14. Based on the reduction of the minimum value $I2_{min}$ of the secondary current I2, the minimum value $I1_{min}$ of the primary current I1 is reduced correspondingly also in the next switching period. This leads to the fact that in this switching period the energy produced in the direction of the input of the switched mode power supply between the start of the switching period (t0) and the zero-crossing of the primary current (t1) is reduced. By means of the primary-side control unit 6, the reduction of the minimum value $I1_{min}$ of the primary current I1 is evaluated in this switching period and the instant at which the switching element S1 is switched off is shifted so that the period of time between the previous zero-crossing of the primary current I1 and the instant at which the switching element S1 is switched off is lengthened. Since energy flows from the primary side into the transformer and is stored there between these instants, the power source generating the input voltage U1 increases the energy flow in dependence on the change of load on the output of the switched mode power supply or in dependence on the structure of the controller or the error amplifier 11, respectively. The result is that the maximum value $I1_{max}$ increases, which is again linked with an increase of the maximum value $I2_{max}$ of the secondary current. This in turn causes an increased energy flow from the transformer in the direction of the output of the switched mode power supply so that an adaptation of the switched mode power supply to the increase of load is achieved.

In various switching periods, the two control units 6 and 7 cooperate in such a way that in the steady state of the switched mode power supply the energy delivered in the direction of the input of the switched mode power supply is controlled to a predefinable value between the instants t0 and t1 which corresponds to a certain value $I1_{min}$ or a certain space of time between the minimum value $I1_{min}$ and the next zero-crossing (space of time between t0 and t1). This ensures that also with a maximum output load, a non-zero switching of the first switching device S1 is guaranteed.

Figure 5:
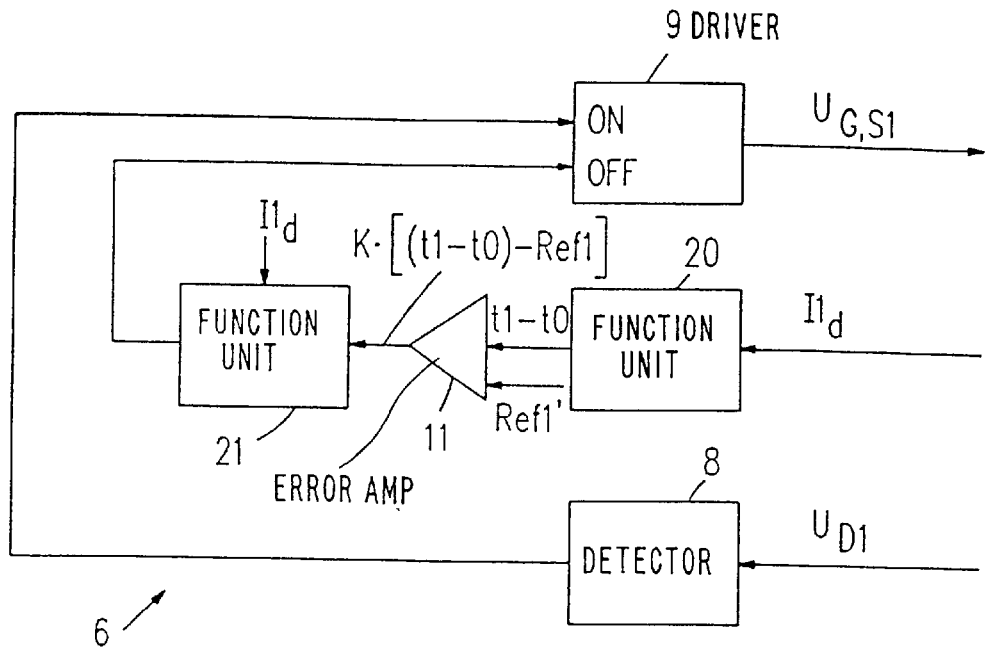
FIG. 5 shows a block circuit diagram for a further embodiment of the primary-side control unit and FIG. 6 shows a block circuit diagram for a further embodiment of the secondary-side control unit.

FIG. 5 shows another embodiment of the primary-side control unit 6. It contains two possibilities of modification. On the one hand, the control unit 6 no longer determines the minimum value $I1_{min}$ of the primary current I1, but by means of the function unit 20 the instant between the occurrence of the minimum value $I1_{min}$ and the next zero-crossing of the primary current I1 (here the difference between t1−t0), which in turn is processed with a modified reference value Ref1' by means of the error amplifier 11. On the other hand, the value produced by the error amplifier 11 is henceforth evaluated by a function unit 21 that does not determine the next switch-off instant when the primary current reaches a cetain maximum value $I1_{max}$, but it determines the switch-off instant t2 insofar as a certain space of time t2−t1 lies between the zero-crossing of the primary current I1 and the switch-on instant t2 of the switching device S1. The two pssibilites of embodiment of the control unit 6 may also be utilized separately. The control based on time spaces is particularly advantageous and may easily be converted in integrated clocked circuits.

Figure 6:
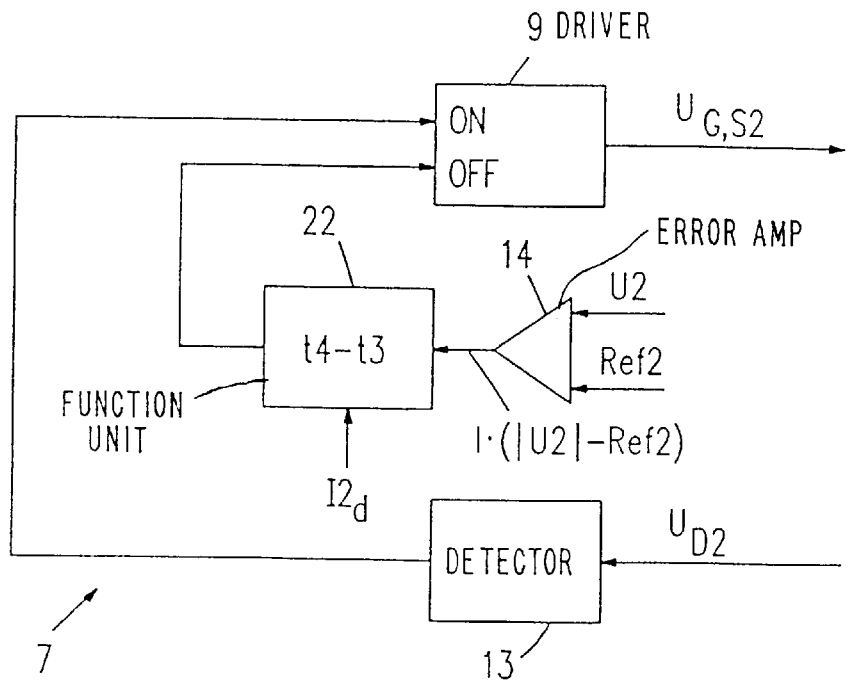

FIG. 6 shows an embodiment of the secondary-side control unit 7. Here a function unit 22 is used instead of the comparator circuit 15, which function unit 22 determines the respective switch-off instant t4 of the switching device S2 so that a certain space of the (second reference value) is predetermined between the zero-crossing of the secondary current I2 and the switch-off instant of the switching device S2 in the respective switching period in dependence on the output signal (first reference value) of the error amplifier 14. This embodiment may again be converted very easily especially in integrated circuits.

Both the primary-side control unit 6 and the secondary-side control unit 7 are preferably realized as integrated circuits. The two control units 6 and 7 may then be converted both as switching circuits on separate chips and switching circuits on one common chip.

What is claimed is:

1. A switched mode power supply comprising:

a transformer having a primary winding and a secondary winding, wherein a primary current flows through said primary winding during a first time period and a secondary current flows through said secondary winding during a second time period;

a first switching device connected in series to said primary winding;

a second switching device connected in series to said secondary winding;

a secondary-side control unit for switching said second switching device to control an output of said switched mode power supply by changing a return energy returning back to said transformer during said second period of time; and a primary-side control unit for switching said first switching device to limit a supplied energy supplied by said transformer during said first period of time toward an input of said switched mode power supply to a predetermined value;

wherein said primary-side control unit switches on said first switching device before said primary current changes direction to flow toward said transformer.

2. The switched mode power supply according to claim 1, wherein said secondary-side control unit switches on said second switching device after said secondary current begins to flow away from said transformer.

3. The switched mode power supply according to claim 1, wherein said predetermined value is a predefinable primary current value present at a start of the first time period.

4. The switched mode power supply according to claim 1, wherein said primary-side control unit is controlled by said predetermined value which is a predefinable primary current value present at a start of the first time period.

5. The switched mode power supply according to claim 1, wherein said primary-side control unit is controlled by a predetermined time period between a beginning of said first time period and a next zero-crossing of said primary current.

6. The switched mode power supply according to claim 1, wherein said primary-side control unit is used for adapting a switch-off instant of said first switching device by adaptation of a maximum primary current value that depends on an output power of said switched mode power supply at an end of said first time period.

7. The switched mode power supply according to claim 1, wherein said primary-side control unit is used for adapting a switch-off instant of said first switching device by adaptation of a length of the first time period.

8. The switched mode power supply according to claim 1, wherein said secondary-side control unit comprises:

first means for forming a first reference value from a difference between said output of said switched mode power supply and a setting value for said output; and second means for forming a second reference value derived from said secondary current; wherein said second switching device is switched off when said second reference value reaches said first reference value.

9. The switched mode power supply according to claim 1, wherein said secondary-side control unit comprises:

first means for forming a first reference value from a difference between said output of said switched mode power supply and a setting value for said output; and second means for forming a second reference value derived from a time elapsed between a zero crossing of the secondary current and an end of said second time period; wherein said second switching device is switched off when said second reference value reaches said first reference value.

10. A circuit arrangement having a switched mode power supply, said switched mode power supply comprising:

a transformer having a primary winding and a secondary winding, wherein a primary current flows through said primary winding during a first time period and a secondary current flows through said secondary winding during a second time period;

a first switching device connected in series to said primary winding;

a second switching device connected in series to said secondary winding;

a secondary-side control unit for switching said second switching device to control an output of said switched mode power supply by changing a return energy returning back to said transformer during said second period of time; and a primary-side control unit for switching said first switching device to limit a supplied energy supplied by said transformer during said first period of time toward an input of said switched mode power supply to a predetermined value;

wherein said primary-side control unit switches on said first switching device before said primary current changes direction to flow toward said transformer.

11. The circuit arrangement according to claim 10, wherein said secondary-side control unit switches on said second switching device after said secondary current begins to flow away from said transformer.

* * * * *